United States Patent
Kohara (10) Patent No.: US 9,144,947 B2
(45) Date of Patent: Sep. 29, 2015

(54) RIGID CORE FOR FORMING TIRE

(71) Applicant: SUMITOMO RUBBER INDUSTRIES, LTD., Kobe-shi, Hyogo (JP)

(72) Inventor: Kei Kohara, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/413,862

(22) PCT Filed: Jun. 6, 2013

(86) PCT No.: PCT/JP2013/065729
§ 371 (c)(1),
(2) Date: Jan. 9, 2015

(87) PCT Pub. No.: WO2014/020991
PCT Pub. Date: Feb. 6, 2014

(65) Prior Publication Data
US 2015/0158260 A1    Jun. 11, 2015

(30) Foreign Application Priority Data

Jul. 30, 2012 (JP) ................................. 2012-168704

(51) Int. Cl.
*B29D 30/12* (2006.01)
*B29D 30/06* (2006.01)

(52) U.S. Cl.
CPC ............ *B29D 30/12* (2013.01); *B29D 30/0661* (2013.01)

(58) Field of Classification Search
CPC ........... B29D 30/0606; B29D 30/0661; B29D 30/12; B29C 33/76
USPC ...................................................... 425/54, 55
See application file for complete search history.

(56) References Cited

U.S. PATENT DOCUMENTS

| | | | |
|---|---|---|---|
| 1,250,504 A * | 12/1917 | Ray ................................. | 425/55 |
| 1,392,347 A * | 10/1921 | Midgley ......................... | 425/55 |
| 1,466,527 A | 8/1923 | Guiley | |
| 1,633,263 A | 6/1927 | Moreland | |
| 6,113,833 A * | 9/2000 | Ogawa ........................... | 425/56 |
| 7,887,312 B2 * | 2/2011 | Lundell .......................... | 425/54 |
| 2010/0116439 A1 | 5/2010 | Lundell | |

FOREIGN PATENT DOCUMENTS

| | | |
|---|---|---|
| JP | 2000-084937 A | 3/2000 |
| JP | 2011-161896 A | 8/2011 |
| JP | 2011-167979 A | 9/2011 |

OTHER PUBLICATIONS

International Search Report issued in PCT/JP2013/065729, mailed on Jul. 2, 2013.

* cited by examiner

*Primary Examiner* — James Mackey
(74) *Attorney, Agent, or Firm* — Birch, Stewart, Kolasch & Birch, LLP (57) ABSTRACT

A core main body comprises first core segments having a small circumferential width and having both circumferential end surfaces as first butting surfaces, and second core segments having a large circumferential width and having both circumferential end surfaces as second butting surfaces, the core main body is formed into an annular shape by butting the circumferentially adjacent first and second butting surfaces against each other. The first butting surface comprises a parallel surface portion being parallel with a center plane in the circumferential width of the first core segment connected to radially outside of an outwardly inclined surface portion inclined so that the circumferential width increases toward the inside in a radial direction.

4 Claims, 7 Drawing Sheets

RIGID CORE FOR FORMING TIRE

TECHNICAL FIELD

The present invention relates to a rigid core for forming a tire which is, by improving butting surfaces of core segments, capable of suppressing the occurrence of steps in the radial direction between the core segments as well as the increase of rubber biting, without deteriorating disassembly performance of the core main body.

BACKGROUND ART

In recent years, a tire forming method using a rigid core has been proposed in order to improve the accuracy of forming a tire (see Patent Documents 1 and 2, for example). The rigid core has a core main body having an outer shape which accords with a shape of a tire cavity surface of a vulcanized tire. By sequentially applying tire constitutional members onto the core main body, a green tire is formed. Then, by putting the green tire into a vulcanizing mold together with the rigid core, the green tire is vulcanized and molded while being sandwiched between the core main body as an inner mold and the vulcanizing mold as an outer mold.

Figure 8A:
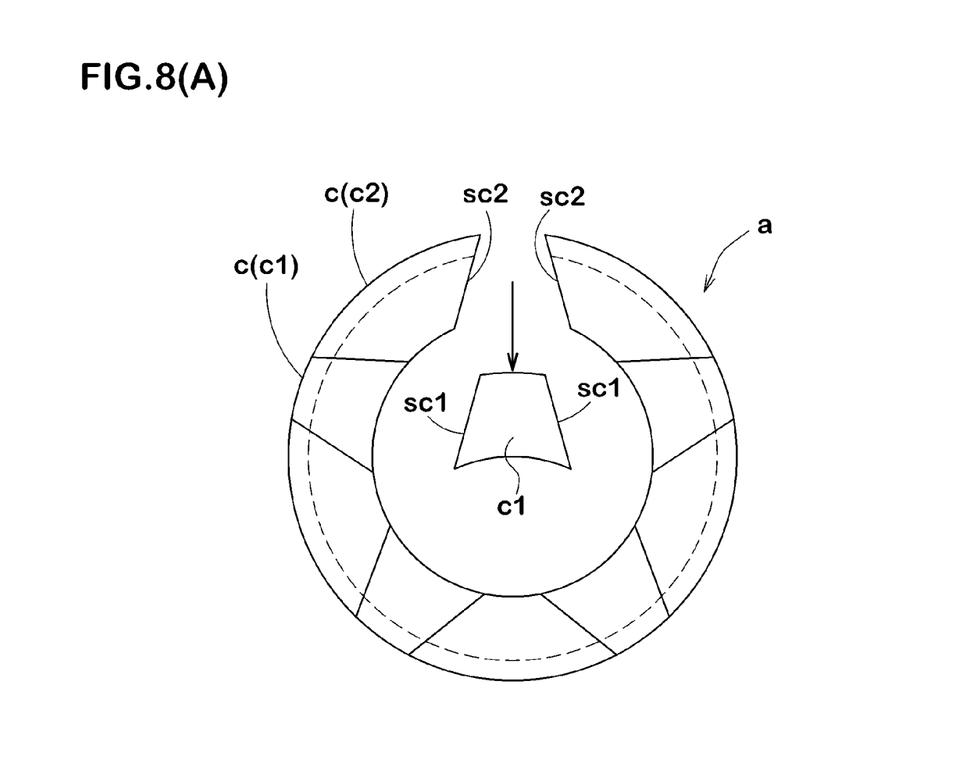

As shown in FIG. 8(A), the core main body (a) is divided into plurality of core segments (c) in the circumferential direction so as to be disassembled and removed from the tire after the vulcanization molding.

For details, the core segments (c) comprise first core segments (c1) having both circumferential end surfaces as first butting surfaces (sc1) and second core segments (c2) having both circumferential end surfaces as second butting surfaces (sc2). The first core segments (c1) are configured to be smaller in the circumferential width than the second core segments (c2). The first core segments (c1) and the second core segments (c2) are alternatively arranged in the circumferential direction. And the core main body (a) is formed into an annular shape by mutually butting the circumferentially adjacent first butting surfaces (sc1) and second butting surfaces (sc2).

The first butting surface (sc1) is formed as an outwardly inclined surface which is inclined so that the circumferential width increases toward the inside in radial direction. In contrast, the second butting surface (sc2) is formed as an inwardly inclined surface which is inclined so that the circumferential width decreases toward the inside in radial direction. Therefore, the core segments (c) are removed from the tire by being moved radially inwardly one-by-one from the first core segments (c1).

Figure 8B:
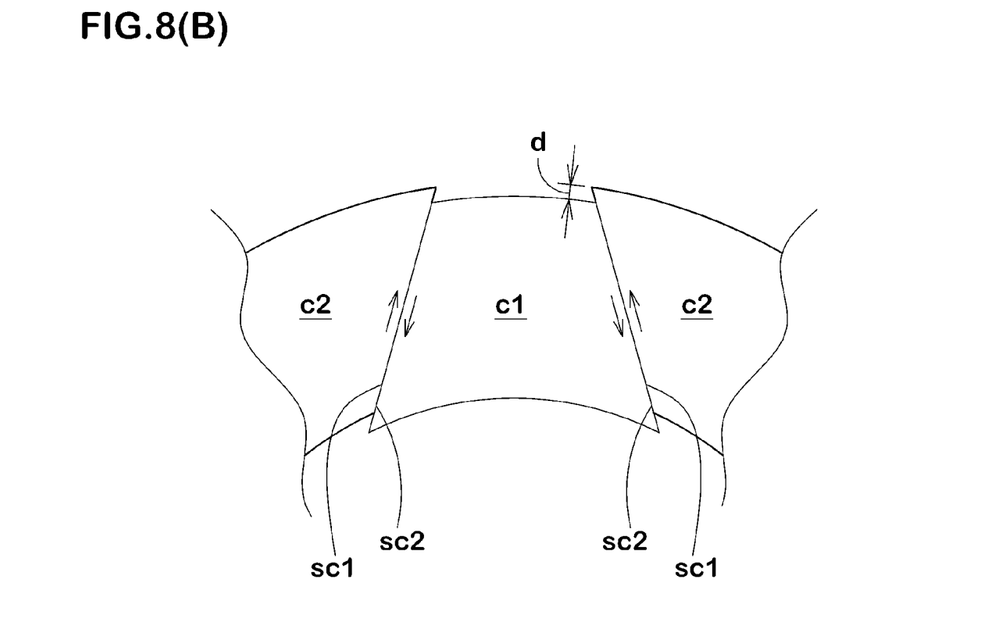

The temperature of the core main body (a) increases from an ordinary temperature state (about 15 to 50 degrees C.) during forming a green tire to a high temperature state (100 degrees C. or more) during vulcanization molding. By such temperature rise, the core main body (a) causes a thermal expansion, and pressure is generated between the circumferentially adjacent core segments (c1), (c2). Owing to the pressure, as shown in FIG. 8(B), the first core segments (c1) having the first butting surface (sc1) as the outwardly inclined surface are pushed radially inwardly whereas the second core segments (c2) having the second butting surface (sc2) as the inwardly inclined surface are pushed radially outwardly. In consequence, there is a problem such that steps (d) in the radial direction are formed between the outer peripheral surfaces of the first core segments (c1) and the second core segments (c2), and the tire is deteriorated in the uniformity.

It is conceivable to increase the amount of gaps between the first butting surfaces (sc1) and the second butting surfaces (sc2) in an ordinary temperature state in order to decrease the steps (d) by suppressing the pressure during vulcanization molding. However, the increase in the amount of gaps has a problem such that, during vulcanization, rubber biting of flow-in rubber becomes liable to occur and the quality of the tire is reduced.

Patent Document 1: Japanese published unexamined application 2011-161896

Patent Document 2: Japanese published unexamined application 2011-167979

DISCLOSURE OF INVENTION

Problem to be Solved by the Invention

It is an object of the present invention to provide a rigid core for forming a tire in which, essentially by forming a first butting surface from an outwardly inclined surface portion and a parallel surface portion being parallel with a center plane in the circumferential width of a first core segment, the occurrence of steps in the radial direction between the first core segments and second core segments as well as an increase in the rubber biting can be suppressed, without deteriorating the disassembly performance of the core main body.

Means of Solving the Problems

To solve the above-mentioned problem, a rigid core for forming a tire, which is a rigid core comprising an annular core main body provided in its outer surface with a tire molding surface portion for forming a green tire, and vulcanizing and molding the green tire between the core main body and a vulcanizing mold by being put into the vulcanizing mold together with the green tire, and which is characterized in that the core main body is composed of a plurality of core segments divided in a circumferential direction, the core segments comprise first core segments having a small circumferential width and having both circumferential end surfaces as first butting surfaces, and second core segments arranged alternately with the first core segments, having a large circumferential width and having both circumferential end surfaces as second butting surfaces, the core main body is formed into an annular shape by butting the circumferentially adjacent first and second butting surfaces against each other, and the first butting surface comprises an outwardly inclined surface portion inclined so that the circumferential width increases toward the inside in a radial direction, and a parallel surface portion connected to the radially outside of the outwardly inclined surface portion via a borderline and being parallel with a center plane in the circumferential width, of the first core segment.

In the rigid core for forming the tire according to the present invention, in the first butting surface, a ratio Sa/S0 of an area Sa of the parallel surface portion and an outline area S0 of the first butting surface surrounded by the outer outline thereof is 0.05 to 0.70.

In the rigid core for forming the tire according to the present invention, in the first butting surface, an angle θ of the outwardly inclined surface portion with respect to the center plane in the circumferential width is 0.01 to 3.0 degrees.

Effect of the Invention

The occurrence of steps in the radial direction between the first and second core segments due to thermal expansion is caused by the first and second butting surfaces inclined with respect to the normal direction perpendicular to the circumferential direction. The above-mentioned step becomes larger as the angle of the inclination becomes larger.

In the present invention, therefore, the first butting surface is formed from the outwardly inclined surface portion inclined so that the circumferential width increases toward the inside in a radial direction, and the parallel surface portion connected to the radially outside of the outwardly inclined surface portion and being parallel with a center plane in the circumferential width, of the first core segment. Thereby, the first butting surface is formed in the form of a bent plane.

The above-mentioned inclination angle with respect to the normal direction is smaller in the parallel surface portion than in the outwardly inclined surface portion. Therefore, when compared with the conventional core main body of which entire first butting surface is formed as an outwardly inclined surface, the step can be reduced. Especially, in the present invention, the parallel surface portion is formed in a radially outer side of the first butting surface having a larger effect on the step, therefore, the steps can be reduced more effectively.

On occasion when the core main body is disassembled, the first core segments are firstly pulled out radially inwardly along the above-mentioned center plane in the circumferential width as in a conventional manner. At this time, the resistance to pulling out the first core segments can be reduced since the first butting surface is provided with the outwardly inclined surface portion. In the rigid core of the present invention, therefore, the disassembly performance of the core main body can be maintained at a comparable level to the conventional rigid core.

In addition, there is no need to increase the amount of gaps between the first and second butting surfaces. Therefore, the rigid core of the present invention can inhibit the occurrence of the rubber biting.

BRIEF EXPLANATION OF THE DRAWING

FIG. 4 (A) is an oblique perspective view of a first core segment showing a first butting surface; and FIG. 4 (B) is a front view of the first butting surface.

FIGS. 7 (A) and (B) are schematic illustrations showing a cavity portion of the core segment for use in Table 1.

FIG. 8 (A) is a side view of a conventional core main body; and FIG. 8 (B) is a side view showing a occurring state of steps in close-up.

EXPLANATION OF THE REFERENCE

1 Rigid core
2 core main body
2S Tire forming surface
5 Core segment
5A First core segment
5B Second core segment
6A First butting surface
6B Second butting surface
10 Outwardly inclined surface portion
11 Parallel surface portion
B vulcanizing mold
Co Center plane in the circumferential width
J Borderline
t Green tire

BEST MODE FOR CARRYING OUT THE INVENTION

Hereinafter, an embodiment of the present invention will be described in detail.

Figure 1:
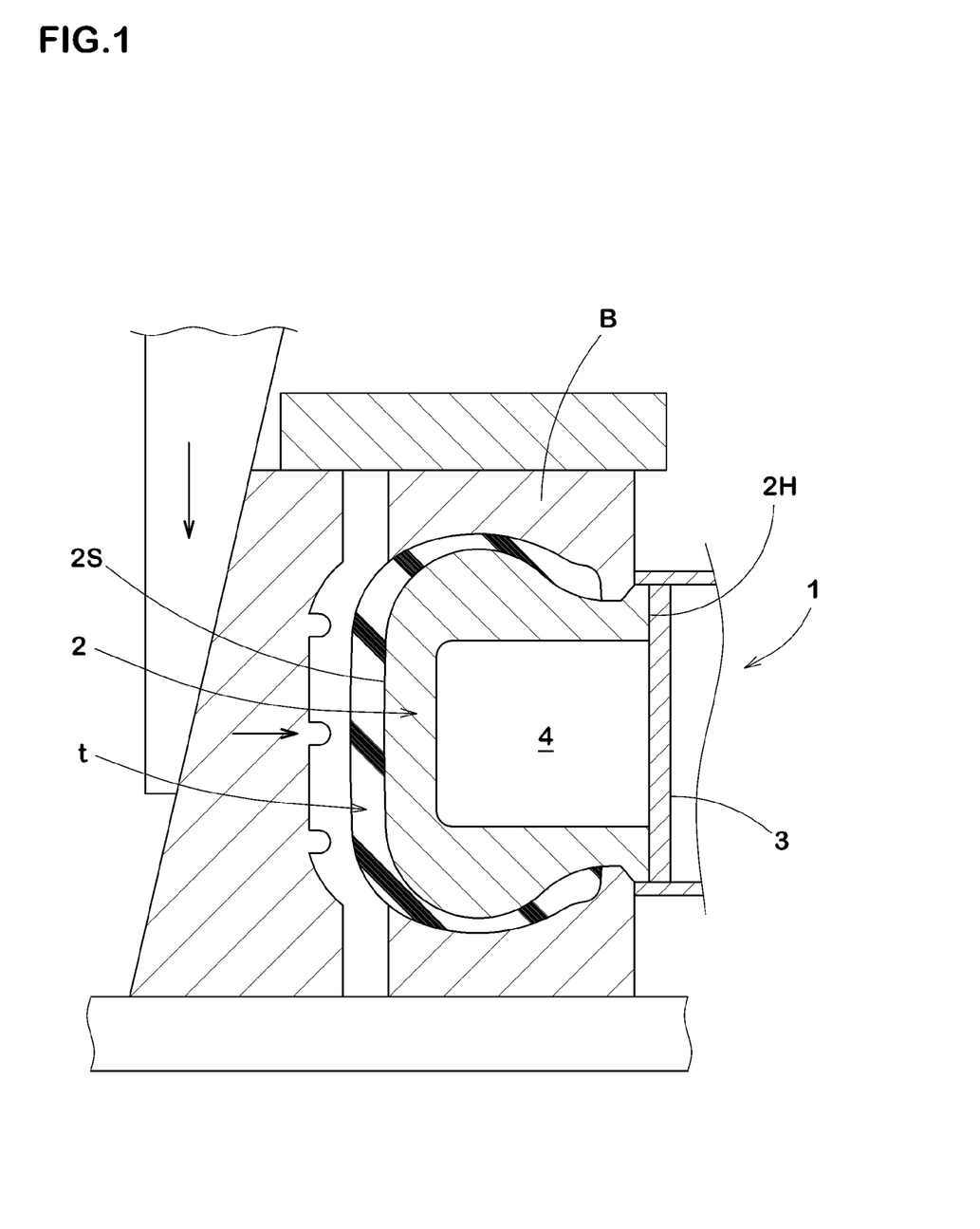
FIG. 1 is a cross sectional view showing a usage state of an embodiment of a rigid core of the present invention.

As shown in FIG. 1, a rigid core 1 for a forming tire according to the present invention comprises an annular core main body 2 provided in its outer surface with a tire molding surface portion 2S. The tire molding surface portion 2S is formed to have approximately the same shape to the form of the inner surface of a finished tire. And, on the tire molding surface portion 2S, tire constitutional members such as a carcass ply, a belt ply, a sidewall rubber, and a tread rubber are sequentially applied so as to form a green tire (t) having approximately the same shape of the finished tire.

The green tire (t) is put into a vulcanizing mold B together with the rigid core 1 as in a conventional manner. And the green tire (t) is heated and pressed between the core main body 2 as an inner mold and the vulcanizing mold B as an outer mold, thereby vulcanizing and molding is conducted.

The rigid core 1 includes the annular core main body 2, and a cylindrical core 3 inserted into a central hole 2H thereof. Except the core main body 2, other known structures can be employed. Therefore hereinafter only the core main body 2 will be explained.

Inside the core main body 2 according to the present invention, there is a cavity portion 4 extending continuously in the circumferential direction. Thereby, the core main body 2 is formed in a hollow shape. In the cavity portion 4, there is a heating means (not shown) such as an electrical heater heating the green tire (t) from inside.

Figure 2:
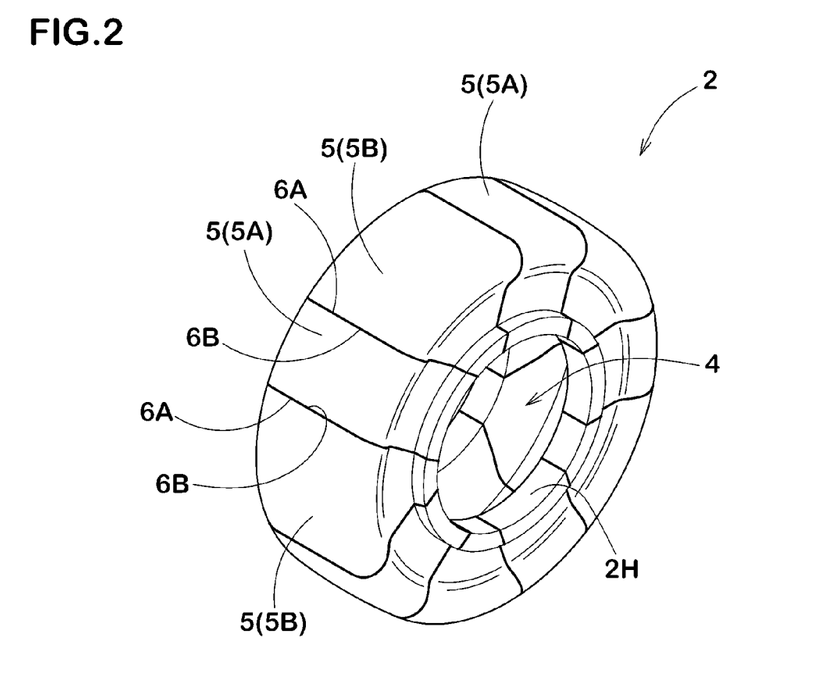
FIG. 2 is an oblique perspective view of a core main body.
Figure 3:
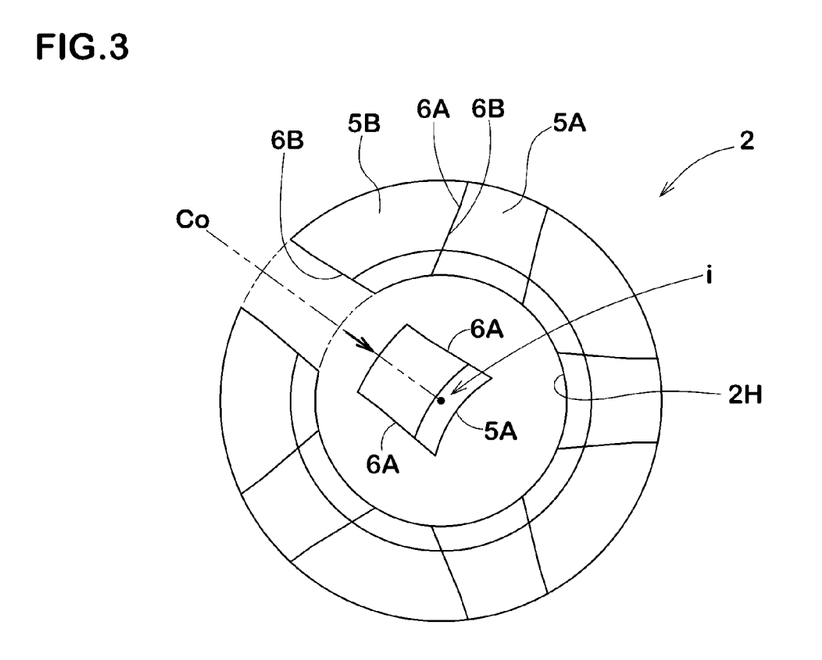
FIG. 3 is a side view of the core main body.

As shown in FIGS. 2 and 3, the core main body 2 is composed of a plurality of core segments 5 divided in a circumferential direction. For details, the core segments 5 included first core segments 5A having both circumferential end surfaces as first butting surfaces 6A and second core segments 5B having both circumferential end surfaces as second butting surfaces 6B. The first core segments 5A are configured to be smaller in the circumferential width than the second core segments 5B. The first core segments 5A and the second core segments 5B are alternately arranged in the circumferential direction. And, the core main body is formed into an annular shape by mutually butting the circumferentially adjacent first butting surfaces 6A and second butting surfaces 6B.

Figure 4A:
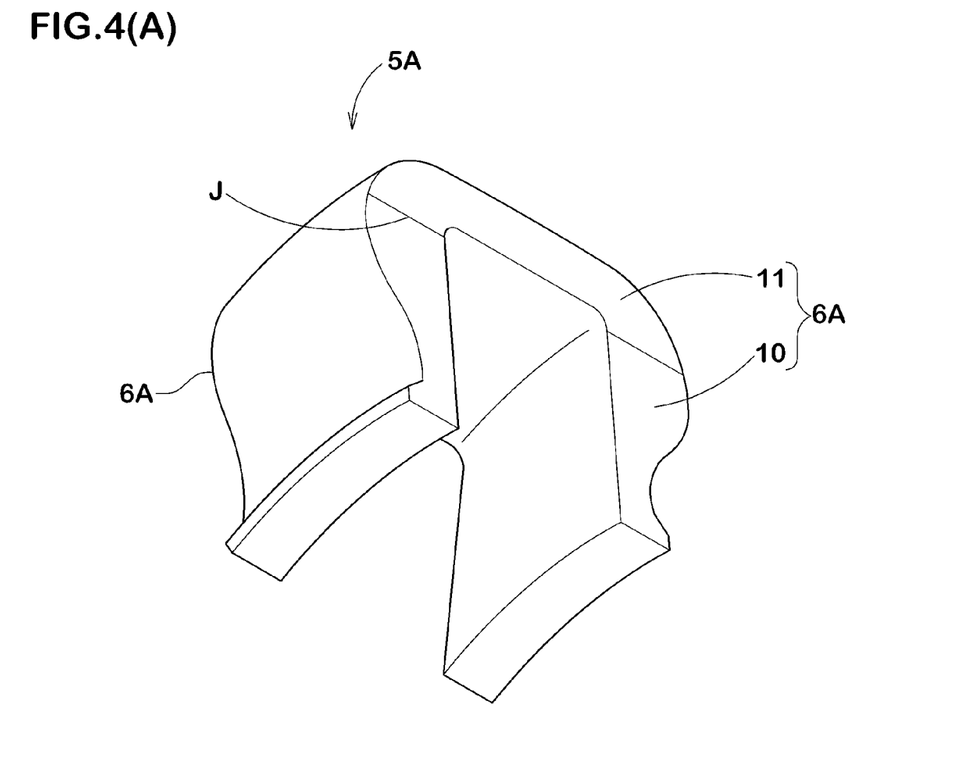
Figure 4B:
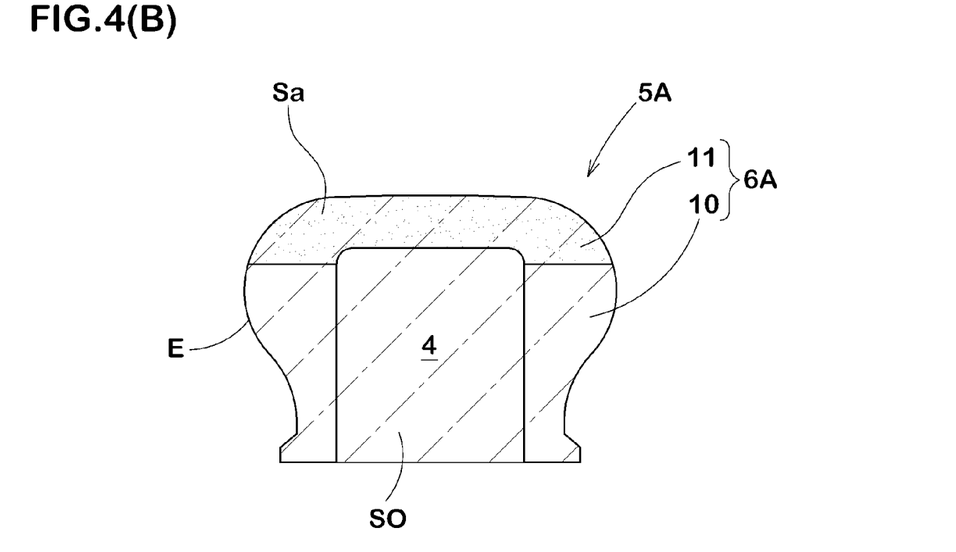

As shown in FIG. 4, the first butting surface 6A comprises an outwardly inclined surface portion 10, and a parallel surface portion 11 connected to the radially outside of the outwardly inclined surface portion 10. The outwardly inclined surface portion 10 and the parallel surface portion 11 are connected via a borderline J. Thereby, the first butting surface 6A is formed in the form of a bent plane.

Figure 5:
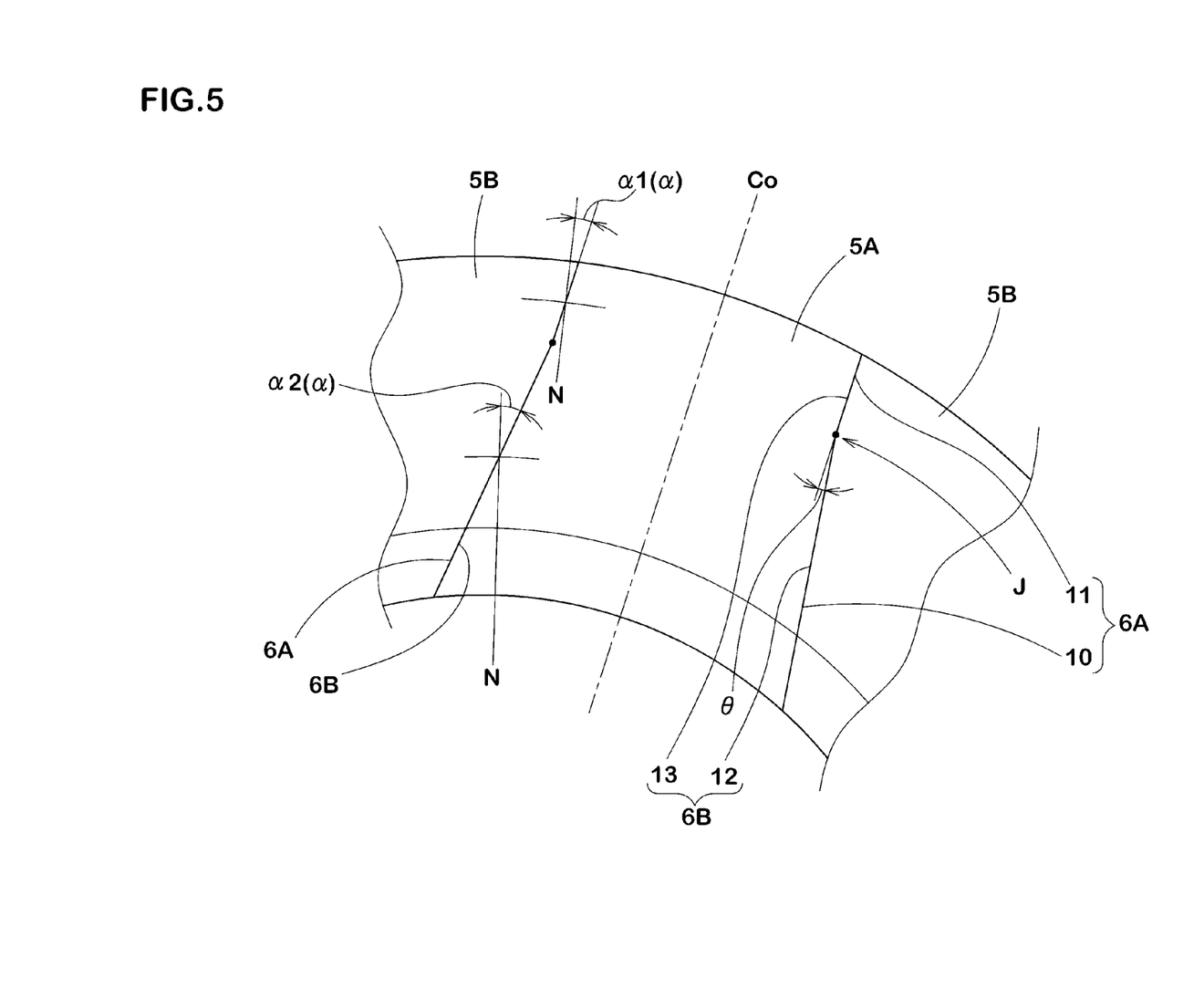
FIG. 5 is a side view showing the first butting surface in close-up.

As shown in FIG. 5, the outwardly inclined surface portion 10 is inclined so that the circumferential width increases toward the inside in a radial direction. The parallel surface portion 11 is parallel with a center plane Co in the circumferential width, of the first core segment 5A. The center plane Co in the circumferential width passes through a core shaft center (i) (shown in FIG. 3).

The second butting surface 6B is formed as a bent plane fitting together with the adjacent first butting surface 6A. Specifically, the second butting surface 6B comprises an inwardly inclined surface portion 12, and a parallel surface portion 13 connected to the radially outside of the inwardly inclined surface portion 12 via a borderline J. The inwardly inclined surface portion 12 is inclined so that the circumferential width decreases toward the inside in a radial direction. Besides, the inwardly inclined surface portion 12 has the same inclination as that of the outwardly inclined surface portion 10. And the parallel surface portion 13 has the same inclination as that of the parallel surface portion 11.

Meanwhile, the occurrence of steps (d) in the radial direction between the first core segments 5A and the second core segments 5B due to thermal expansion is due to the inclinations of the first butting surfaces 6A and the second butting surfaces 6B with respect to the normal direction N perpendicular to the circumferential direction. Further, there is a tendency that the steps (d) become larger as the inclination angles α of the first butting surfaces 6A and the second butting surfaces 6B become larger.

Therefore, in the present embodiment, by configuring the first butting surface 6A and the second butting surfaces 6B as described above, the inclination angles α1 of the respective parallel surface portions 11, 13 with respect to the normal direction N are set to be smaller than the inclination angles α2 of the outwardly inclined surface portion 10 and the inwardly inclined surface portion 12 with respect to the normal direction N. Accordingly, in the present embodiment, when compared with the conventional core main body of which entire first butting surface and second butting surface are formed as the outwardly inclined surface or the inwardly inclined surface, the occurrence of steps (d) can be reduced. Moreover, in the present embodiment, since the parallel surface portions 11, 13 are formed in a radially outer side which has a larger effect on the steps and in which the steps (d) occur, the occurrence of the steps (d) can be more effectively suppressed.

The core main body 2 is disassembled, the first core segments 5A are firstly pulled out radially inwardly along the center plane Co in the circumferential width as in a conventional manner. At this time, the resistance to pulling out the first core segments 5A can be reduced since the first butting surface 6A is provided with the outwardly inclined surface portion 10. In the present embodiment, therefore, the disassembly performance of the core main body 2 can be maintained at a comparable level to the conventional rigid core.

To maintain the disassembly performance of the core main body 2, the angle θ of the outwardly inclined surface portion 10 with respect to the center plane Co in the circumferential width, namely, the angle θ of the outwardly inclined surface portion 10 with respect to the parallel surface portion 11, is preferably 0.01 to 3.0 degrees. When the above-mentioned angle θ is less than 0.01 degree, the resistance to pulling out the first core segments 5A becomes too large, and there is a possibility that the disassembly performance of the core main body 2 deteriorates. However, when the angle θ is more than 3.0 degree, a force which pushes the second core segments 5B radially outward becomes large, and there is a possibility that the occurrence of the steps (d) can not be reduced effectively. Based on these standpoints, the angle θ is preferably not less than 0.1 degree and preferably not more than 1.0 degree.

Besides, in order to effectively reduce the occurrence of the steps (d), it is desirable that, as shown in FIG. 4(B), a ratio Sa/SO of an area Sa of the parallel surface portion 11 (indicated by a dot pattern) and an outline area SO of the first butting surface 6A surrounded by the outer outline E thereof (indicated by a hatched pattern) is 0.05 to 0.70. The outline area SO is an apparent area of the first butting surface 6A, and includes a sectional area of the inner cavity portion 4.

When the ratio Sa/SO is less than 0.05, the parallel surface portion 11 becomes too small, and there is a possibility that the occurrence of steps (d) can not be reduced more effectively. when the ratio Sa/SO is more than 0.70, the resistance to pulling out the first core segments 5A becomes too large, and there is a possibility that the disassembly performance of the core main body 2 deteriorates. Based on these standpoints, the ratio Sa/SO is preferably not less than 0.1 and not more than 0.5.

Meanwhile, when the division number (n) of the core main body 2 is larger, the inclination angle α1 of the parallel surface portion 11 and the inclination angle α2 of the outwardly inclined surface portion 10 with respect to the normal direction N become relatively smaller, and the effect to suppress the steps (d) tends to be heightened. However, if the division number (n) of the core main body 2 is too large, the number of the core segments 5 increases, and there is a possibility that the component cost is increased, and the time for removing all of the core segments 5 from the tire is increased. Based on these standpoints, it is preferable that the division number (n) of the core main body 2 is in a range of from 8 to 16.

Figure 6:
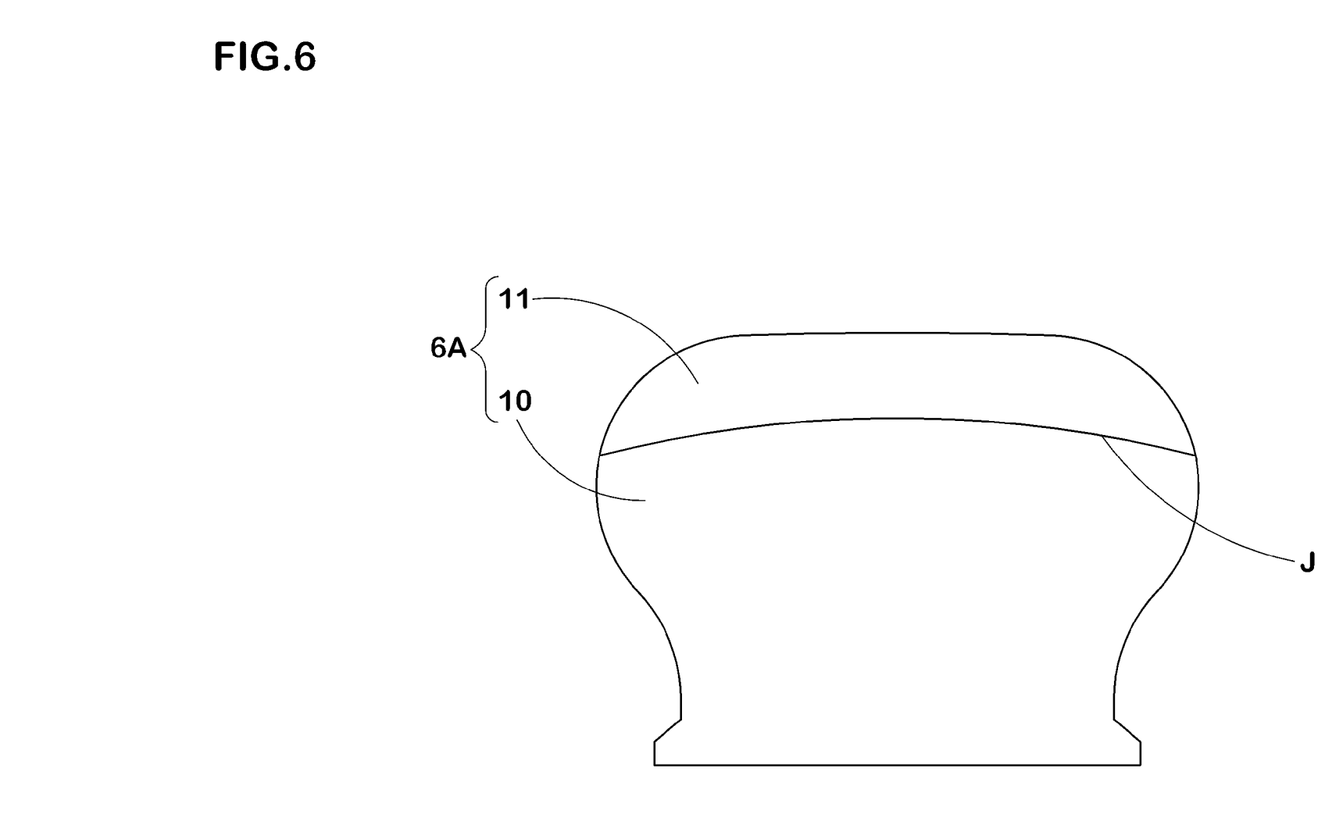
FIG. 6 is a front view showing another embodiment of the first butting surfaces.

The borderline J in the butting surfaces 6A, 6B is not limited to such a shape of the straight line according to the present embodiment. As shown in FIG. 6, the borderline J may be formed as an arc-like curved line. Note that the curved borderline J is complicated to manufacture, and it needs a high working accuracy. Therefore, the borderline J is preferably formed as the straight line.

Figure 7A:
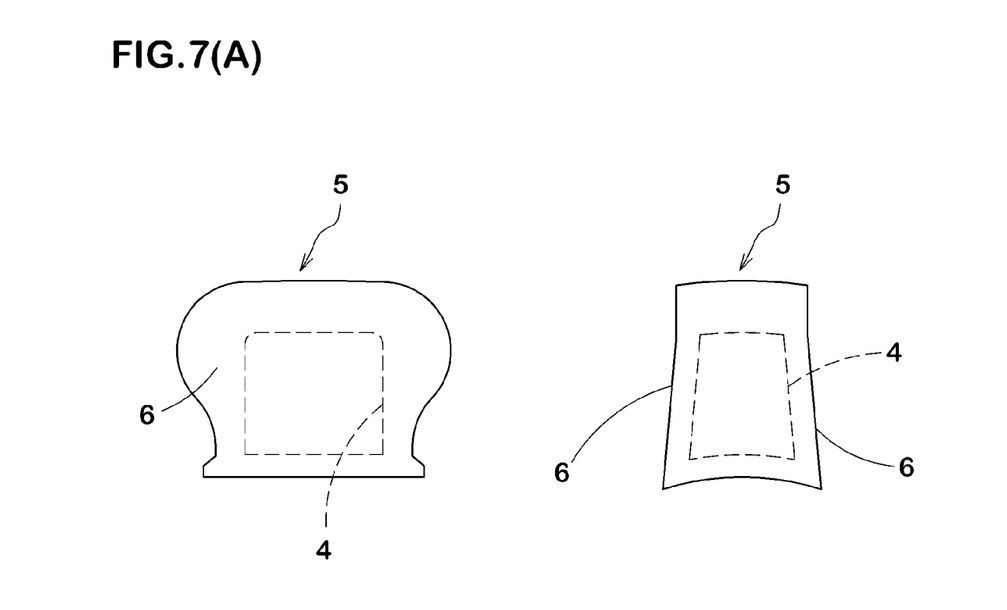

The cavity portion 4 may not be continued via the butting surfaces 6 in the circumferential direction. For example, as shown in FIG. 7 (A), the cavity portion 4 is not opened on the butting surface 6 but may be closed inside each of the core segments 5. In this case, heated fluid such as steam may be injected into each of the cavity portions 4, and it enables to heat the inside of the green tire (t) via the core main body 2.

Although the especially preferred embodiment of the present invention has been described in detail, needless to say, the invention is not limited to the above-mentioned specific embodiments shown in the drawings, but various modifications can be made.

EMBODIMENT

To confirm the efficacy of the present invention, a core main body for forming the tire having a tire size of 195/65R15 was formed based on the specification shown in Table 1 as a prototype. Then, during forming the pneumatic tire by use of the test core main body, occurrence status of steps on the outer peripheral surface, performance of rubber biting between the butting surfaces, performance of removal of the core segments and the like were assessed.

Each of the core main body was formed of aluminum (coefficient of thermal expansion=$23.1 \times 10^{-6}$/degrees). The core main body was used for forming a green tire at a ordinary temperature state (20 degrees C.) and heated in a vulcanizing mold to a high temperature state at 150 degrees C. Table 1 shows an amount of gaps between the butting surfaces, an angle θ of a outwardly inclined surface portion, and a ratio Sa/SO measured at the ordinary temperature state (20 degrees C.), respectively. Items other than the descriptions in Table 1 were substantially the same specification.

(1) Occurrence Status of Steps:

Steps in the radial direction between the first and second core segments, when the core main body was heated up to 150 degrees C., was measured at the tire equator by use of a dial gauge, and rated on a scale of one to ten where Comparative Example 1 was five. The smaller the numeric value, the smaller or better the step.

(2) Performance of Rubber Biting:

After the vulcanization molding, an amount of rubber bitten between the butting surfaces was measured, and rated on a scale of one to ten where Comparative Example 1 was five. The smaller the numeric value, the less or better the rubber biting.

(3) Performance of Removal:

After the vulcanization molding, a pulling-out force during removing the first core segments from the tire by pulling out radially inwardly was measured, and rated on a scale of one to ten where Comparative Example 1 was five. The smaller the numeric value, the easier or better the removal.

(4) Removal Process Time:

The time for a process of removing all of core segments from the tire was measured, and rated on a scale of one to ten where Comparative Example 1 was five. The smaller the numeric value, the easier or better the removal.

TABLE 1

Figure 7B:
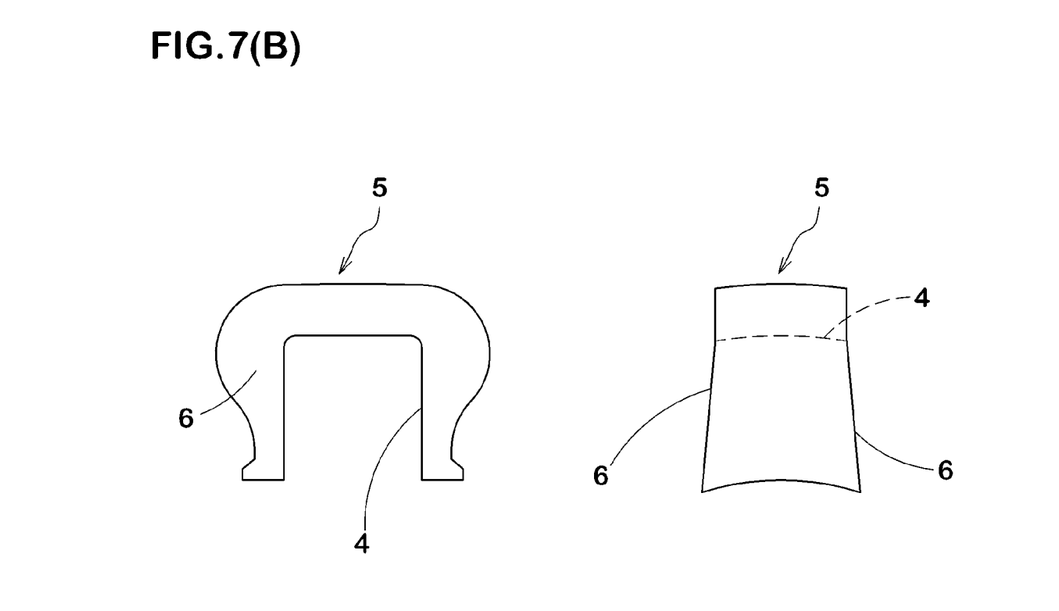

| | Com. Ex. 1 | Com. Ex. 2 | Com. Ex. 3 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- | --- |
| Division number (n) of core | | | | | | 10 | | | | | |
| Form of butting surface | | | | | | FIG. 7 (B) | | | | | |
| Amount of gaps of butting surface [mm] | | 0.2 | | | | | | 0.1 | | | |
| Angle θ of outwardly inclined surface portion [degree] | 0.5 | 0 | | | | | | 0.5 | | | |
| Existence or non-existence of parallel surface portion | None | Presence | None | | | | | Presence | | | |
| Ratio Sa/SO [%] | — | 100 | — | 5 | 10 | 15 | 30 | 50 | 60 | 70 | 80 |
| Evaluation items | | | | | | | | | | | |
| Occurrence status of steps | 5.0 | 2.0 | 8.0 | 7.0 | 5.0 | 4.0 | 2.0 | 1.7 | 1.5 | 1.3 | 1.0 |
| Performance of rubber biting | 5.0 | 5.0 | 2.0 | 2.0 | 2.0 | 2.0 | 2.0 | 2.0 | 2.0 | 2.0 | 2.0 |
| Performance of removal | 5.0 | 10.0 | 5.5 | 4.0 | 4.3 | 4.5 | 5.0 | 7.0 | 8.0 | 8.5 | 9.0 |
| Removal process time | 5.0 | 5.0 | 5.0 | 5.0 | 5.0 | 5.0 | 5.0 | 5.0 | 5.0 | 5.0 | 5.0 |

| | Ex. 9 | Ex. 10 | Ex. 11 | Ex. 12 | Ex. 13 | Ex. 14 | Ex. 15 | Ex. 16 | Com. Ex. 4 | Com. Ex. 5 |
| --- | --- | --- | --- | --- | --- | --- | --- | --- | --- | --- |
| Division number (n) of core | | | 10 | | | | | 4 | 16 | 4 | 16 |
| Form of butting surface | | | | | FIG. 7 (B) | | | | | |
| Amount of gaps of butting surface [mm] | | | | 0.1 | | | | | 0.2 | |
| Angle θ of outwardly inclined surface portion [degree] | 0.01 | 0.1 | 1.0 | 2.0 | 3.0 | 4.0 | | | 0.5 | |
| Existence or non-existence of parallel surface portion | | | | Presence | | | | | None | |
| Ratio Sa/SO [%] | | | | 30 | | | | | — | |
| Evaluation items | | | | | | | | | | |
| Occurrence status of steps | 1.5 | 1.7 | 4.0 | 6.0 | 7.0 | 8.0 | 5.0 | 1.8 | 6.0 | 4.0 |
| Performance of rubber biting | 2.0 | 2.0 | 2.0 | 2.0 | 2.0 | 2.0 | 4.0 | 2.0 | 4.0 | 5.5 |
| Performance of removal | 7.0 | 5.5 | 4.5 | 4.0 | 3.5 | 3.0 | 6.0 | 4.0 | 6.0 | 4.0 |
| Removal process time | 5.0 | 5.0 | 5.0 | 5.0 | 5.0 | 5.0 | 3.0 | 8.0 | 3.0 | 8.0 |

| | Ex. 17 | Ex. 18 | Com. Ex 6 | Com. Ex 7 | Ex. 19 | Ex. 20 | Com. Ex 8 |
| --- | --- | --- | --- | --- | --- | --- | --- |
| Division number (n) of core | | | | 10 | | | |
| Form of butting surface | | FIG. 7 (B) | | | | FIG. 7 (A) | |
| Amount of gaps of butting surface [mm] | 0.2 | 0.4 | 0.4 | 0.2 | 0.1 | 0.1 | 0.2 |
| Angle θ of outwardly inclined surface portion [degree] | | 0.5 | | 2.0 | | 0.5 | |
| Existence or non-existence of parallel surface portion | Presence | | None | | Presence | | None |
| Ratio Sa/SO [%] | 30 | | — | | 30 | 40 | — |
| Evaluation items | | | | | | | |
| Occurrence status of steps | 1.5 | 1.0 | 1.0 | 7.0 | 4.0 | 3.0 | 5.0 |
| Performance of rubber biting | 5.0 | 8.0 | 8.0 | 5.0 | 2.0 | 2.0 | 5.0 |
| Performance of removal | 5.0 | 3.0 | 3.0 | 3.0 | 5.0 | 5.5 | 5.0 |
| Removal process time | 5.0 | 5.0 | 5.0 | 5.0 | 5.0 | 5.0 | 5.0 |

From the test result, it was confirmed that, as shown in Table 1, the rigid core of the present embodiment could suppress the amount of steps occurred between the core segments while inhibiting deteriorations of the performance of the rubber biting and the performance of removal.

The invention claimed is:

1. A rigid core for forming a tire, which is a rigid core comprising an annular core main body provided in its outer surface with a tire molding surface portion for forming a green tire, and vulcanizing and molding the green tire between the core main body and a vulcanizing mold by being put into the vulcanizing mold together with the green tire, and which is characterized in that the core main body is composed of a plurality of core segments divided in a circumferential direction,
the core segments comprise
first core segments having a small circumferential width and having both circumferential end surfaces as first butting surfaces, and
second core segments arranged alternately with the first core segments, having a large circumferential width and having both circumferential end surfaces as second butting surfaces,
the core main body is formed into an annular shape by butting the circumferentially adjacent first and second butting surfaces against each other, and
the first butting surface comprises
an outwardly inclined surface portion inclined so that the circumferential width increases toward the inside in a radial direction, and
a parallel surface portion connected to the radially outside of the outwardly inclined surface portion via a borderline and being parallel with a center plane in the circumferential width, of the first core segment.

2. The rigid core for forming a tire as set forth in claim 1, which is characterized in that,
in the first butting surface,
a ratio Sa/SO of
an area Sa of the parallel surface portion and
an outline area SO of the first butting surface surrounded by the outer outline thereof is 0.05 to 0.70.

3. The rigid core for forming a tire as set forth in claim 1, which is characterized in that,
in the first butting surface,
an angle θ of the outwardly inclined surface portion with respect to the center plane in the circumferential width is 0.01 to 3.0 degrees.

4. The rigid core for forming a tire as set forth in claim 2, which is characterized in that,
in the first butting surface,
an angle θ of the outwardly inclined surface portion with respect to the center plane in the circumferential width is 0.01 to 3.0 degrees.

* * * * *